United States Patent
Muhle et al.

(10) Patent No.: US 6,831,140 B2
(45) Date of Patent: Dec. 14, 2004

(54) STATIC MEASUREMENT AND DETECTION IN A GAS PHASE POLYETHYLENE REACTOR

(75) Inventors: Michael Elroy Muhle, Kingwood, TX (US); Robert Olds Hagerty, La Porte, TX (US); John Francis Szul, Hurricane, WV (US); Mark Gregory Goode, Hurricane, WV (US); Laurence G. Britton, Charleston, WV (US)

(73) Assignee: Univation Technologies, LLC, Houston, TX (US)

(*) Notice: Subject to any disclaimer, the term of this patent is extended or adjusted under 35 U.S.C. 154(b) by 0 days.

(21) Appl. No.: 10/717,820

(22) Filed: Nov. 20, 2003

(65) Prior Publication Data

US 2004/0132931 A1 Jul. 8, 2004

Related U.S. Application Data

(60) Provisional application No. 60/436,533, filed on Dec. 26, 2002.

(51) Int. Cl.[7] .................................................. C08F 2/34
(52) U.S. Cl. ..................... 526/74; 526/901; 422/139; 423/302
(58) Field of Search .................. 526/74, 901; 422/139; 423/302

(56) References Cited

U.S. PATENT DOCUMENTS

| | | | |
|---|---|---|---|
| 4,532,311 A | 7/1985 | Fulks et al. | 526/62 |
| 4,792,592 A | 12/1988 | Fulks et al. | 526/62 |
| 4,803,251 A | 2/1989 | Goode et al. | 526/59 |
| 4,855,370 A | 8/1989 | Chirillo et al. | 526/74 |
| 5,391,657 A | 2/1995 | Song et al. | 526/74 |
| 5,405,922 A | 4/1995 | DeChillis et al. | 526/68 |
| 5,436,304 A | 7/1995 | Griffin et al. | 526/68 |
| 6,008,662 A | 12/1999 | Newton et al. | 324/724 |
| 6,548,610 B2 * | 4/2003 | Bartilucci et al. | 526/74 |

FOREIGN PATENT DOCUMENTS

EP  0604990  7/1994

\* cited by examiner

Primary Examiner—William K. Cheung (57) ABSTRACT

The invention relates to a method for evaluating the condition of a fluidized bed reactor by examining the condition of the reactor wall. Specifically, the invention relates to a method for measuring static in the reactor using a static probe that is located at the distributor plate and comprises a distributor plate cap. The invention also relates to methods of determining a static level using a radio frequency (rf). The static measurements are provided to indicate or predict major continuity disturbances in the fluidized bed gas phase reactor.

12 Claims, 5 Drawing Sheets

STATIC MEASUREMENT AND DETECTION IN A GAS PHASE POLYETHYLENE REACTOR

CROSS REFERENCE TO RELATED APPLICATION

The present application claims priority to provisional patent application U.S. Ser. No. 60/436,533 filed on Dec. 26, 2002.

TECHNICAL FIELD

The invention relates to a method for evaluating the condition of a fluidized bed reactor by determining static characteristic during polymerization. Specifically, the invention relates to methods for determining instantaneous static levels at the distributor plate of fluidized bed reactors. The invention especially relates to measuring static levels during metallocene-catalyzed polymerizations. The static measurements provide an indication of major continuity disturbances in the fluidized bed gas phase reactor.

BACKGROUND OF THE INVENTION

In the gas phase process for production of polyethylene, gaseous ethylene, hydrogen, co-monomer and other raw materials are converted to solid polyolefin product in a commercial gas phase reactor, which consists of a fluidized bed reactor, a compressor and a cooler. The reaction is maintained in a suspended two-phase mixture of granular polyethylene and gaseous reactants by the fluidizing gas which is passed through a distributor plate near the bottom o the reactor. The reactor is normally constructed of carbon steel and rated for operation at pressures up to about 50 bars (or about 3.1 MPa). Catalyst is injected into the fluidized bed. Heat of reaction is transferred to the circulating gas stream. This gas stream is compressed and cooled in the external recycle line and then is reintroduced into the bottom of the reactor wherein it passes through the distributor plate. Make-up feedstreams are added to maintain the desired reactant concentrations. Operation of the reactor is critically dependent upon good mixing for uniform reactor conditions and heat removal. The process must be controllable, capable of high production rate and free from upsets due to particle overheating.

The internal surfaces of the reactor are also composed of carbon steel, and in a normal state appear as a plain, uncoated metal. But reactors that have been in service for any length of time typically have a thin coating of polymer adhered to the interior. The coating is usually thin and relatively clear, making its presence difficult to detect visually. Consequently, the wall coating is detected with a thickness meter, which indicates a typical thickness on the order of about 10 to 50 microns. This coating has a significant effect on the operability of the reactor through its affect on the static charging characteristics of the fluid bed.

The major detriment to good operability is the problematic and frequent "sheeting" events. Sheeting is associated with the undesirable accumulation of polymer along the reactor wall in the zone occupied by the main fluid bed. This accumulation is believed to be associated with "fines", the fine particles less that 100–200 microns. These fines are more influenced by static electrical forces due to their larger surface area relative to their mass, a counter-play of static versus inertial forces.

The stagnation of the resin particles results in a significant reduction in the heat transfer from the nascent particles, precisely at the point in their growth that heat generation per unit surface area is at a maximum. The next result is an interplay of forces which results in particle overheating, melting and agglomeration with adjacent particles, both overheated and normal type particles. The net result is the formation of sheets along the vessel wall. Progressive cycles in this process eventually result in the growth of the sheet and its falling into the fluid bed. These sheets interrupt fluidization, circulation of gas and withdrawal of the product from the reactor requiring a reactor shutdown for removal.

U.S. Pat. Nos. 4,803,251 and 5,391,657 describe a static mechanism as a contributor to the sheeting phenomena whereby catalyst and resin particles adhere to the reactor walls due to static forces. Numerous causes for static charge exist. Among them are generation due to frictional electrification of dissimilar materials, limited static dissipation, introduction to the process of minute quantities of prostatic agents, and excessive catalyst activities. Strong correlation exists between sheeting and the presence of excess static charges, either negative or positive. The critical level for sheet formation is not a fixed value, but is a complex function dependent on variables including resin sintering temperature, operating temperature, drag forces in the fluid bed, resin particle size distribution and recycle gas composition.

Sudden changes in static levels followed closely by deviation in temperatures at the reactor wall is evidence of a sheeting occurrence. These temperature deviations are either high or low. Low temperatures indicate particle adhesion causing an insulating effect from the bed temperature and are commonly referred to as "cold bands". High deviations indicate reactions are taking place in zones of limited heat transfer and are commonly referred to as "hot spots".

Another undesirable place where fines accumulate is the disengaging section of the reactor termed the expanded section, which consists of a region of expanded cross-section above the reaction zone. The function of the expanded section is to reduce the velocity of the fluidizing gas in order to minimize the entrainment of fine particles in the gas leaving the reactor. The entrained fines concentrate in the regions of lower gas velocity. The intention is to use this concentration of particles to "wash" the inclined portion of the expanded section by the downward sliding of these particles onto each other and back into the fluid bed section of the reactor. However, the increased loading of polymer in the expanded section may increase the heat load in an area having low heat transfer capability due to the loss of fluidization and particle mixing in this zone. The resulting excess of heat generation relative to heat removal leads to the melting and fusing of polymer into sheets. As the sheets increase in mass, gravity pulls the "dome" sheets into the main reactor section. The impact on reactor operation can be even more serious because the dome sheets generally possess a large surface area and are thicker than wall sheets. In extreme cases, a large dome sheet causes total blockage of the distributor plate and the formation of a single large reactor agglomerate, or chunk. It is thought that increased polymer loadings in the expanded section results initially from statically charged fines first clinging in this area of reduced gas velocities. That is, it is hypothesized that static generation occurs elsewhere in the reactor and/or recycle system and the consequence thereof is dome sheeting and/or chunking.

Because of the significant manufacturing and operating costs associated with the occurrence of sheeting-related events, mechanisms to control "sheeting" in fluidized bed reactors are continuing areas of investigation in the industry (for example, see U.S. Pat. Nos. 5,436,304 and 5,405,922). Another technique that is directed to reducing sheeting involves the introduction of water into the reactor at a site proximate the reactor walls in an amount sufficient to maintain the electrostatic levels at the site of possible sheet formation at levels which avoid sheeting without substantially altering the effectiveness of the catalyst(s) employed (U.S. Pat. No. 4,855,370, which in herein incorporated by reference in it entirety). Various methods described involve monitoring static charges near the reactor wall in regions that display a high propensity of sheeting. For example, static levels are controlled within a predetermined range by introducing a static control agent into the reactor (U.S. Pat. Nos. 4,803,251 and 5,391,657). In these cases, static charge is measured using static voltage indicators such as voltage probes or electrodes, and measurements are taken at or near the reactor wall, at or below a site commonly plagued by sheet formation.

Static level; in a fluidized bed are typically measured and determined using static probes. Conventional static probes use a rod with a ball on the nd of the probe to determine the static level by measuring voltage in the fluidized bed tar. The ball-type probe is usually inserted into the reactor. EP 0604990 and U.S. Pat. No. 6,008,662 both describe in-reactor ball-type static probe; (see also, U.S. Pat. Nos. 4,532,311; 4,792,592; 4,855,370. However, measurements taken with the conventional static probes do not indicate the origin of the static, which is important in assessing operability of the reactor. More importantly, it is difficult to locate conventional static probe a certain position throughout the reactor and/or recycle system. For example, it is difficult to locate conventional static probes at the distributor plate. Furthermore, conventional static probes placed at conventional locations are ineffective in detecting instances of high static generation during polymerizations with metallocene catalyst systems. With ineffective detection, sheeting incidents occur without any apparent wanting of the onset thereof. Conversely, effective early detection allows the performance of corrective operations and actions to avoid or minimize sheet formation.

Based on Applicants hypothesis that the substantial static originates at the distributor plate, the present invention is directed to systems and methods of determining a reactor wall condition, including the reactor dome condition, using a static detector that is located at the distributor plate. The novel detector (which measures current flow through the distributor plate) provides more information and improved sensitivity as compared to conventional static detection methods. Alternatively, the present invention provides a static detection system that employs radio frequency. Further, the methods of the present invention indicate a condition of the reactor wall, and more particularly indicate major continuity disturbances in an operating reactor.

BRIEF SUMMARY OF THE INVENTION

The present invention is directed to systems and methods that determine a reactor wall condition by measuring static levels therein.

Measurement of the static levels in the reactor may be accomplished by one of several means. First, the invention relates to a method for determining instantaneous static levels or the development of static charges by using a static detector comprised of an electrically isolated distributor plate cap. With the novel detector, it has been surprisingly discovered that for metallocene-catalyzed polymerizations, static charges first develop at or near the distributor plate. By careful monitoring the charges at the distributor plate, changes in the charges that are indicative of changes in the reactor can be detected early allowing more time to take corrective measures to void or minimize reactor sheeting and/or chunking incidents.

In an alternative embodiment, static levels can be measured using a radio frequency detector. In this embodiment, changes in the radio frequencies in the reactor are measured and used to predict changes in reactor conditions.

In yet another embodiment of the present invention, the static level measured is employed in a non-linear dynamic calculation to determine the reactor wall condition, and more particularly to predict the onset of a major continuity disturbance.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Monitoring of static changes in a fluidized bed gas phase reaction is a useful method for detecting changes in the reactor which indicate the onset of discontinuities such as sheeting The sooner these changes can be detected, sooner corrective action can be taken, thereby reducing the chances of a discontinuity in the reactor. The present invention provides methods for detecting changes in the static changes in the reactor early on. This early detection allows for better control of the reactor.

Static Detection at Distributor Plate

Conventional static probes use a rod with a ball on the end of the probe to measure the static in a fluidized bed gas phase reactor. However, measurements of static at the distributor plate have not been obtained due to, among other factors, the difficulty of placing a conventional probe on the distributor plate. The present invention is directed to measuring the static of a reactor using an electrically isolated distributor plate cap as the static probe. The static probe is located at the distributor plate of the reactor.

Generally, the gas distributor plate serves to ensure proper gas distribution and to support the resin bed when gas flow is stopped. For example, during operation of the reactor and after a catalyst(s) and polymerizable materials have been introduced into the reactor, cycle gas enters the bottom of the reactor and passes upward through a gas distributor plate into a fluidized bed located in the straight-sided section of the vessel. Gas leaving the fluidized bed entrains resin particles, and most of these particles are disengaged as the gas passes through the expanded section where its velocity is reduced. Measurements taken at the distributor plate using the static probe of the present invention have indicated that the velocity is 10–100 times that in the bed. Because metal-to-polymer contact occurs on the plate, charge transfer from dissimilar materials is more likely to occur. Taken together, the net result is a massive charge generation at the plate relative to the bed.

Figure 1:
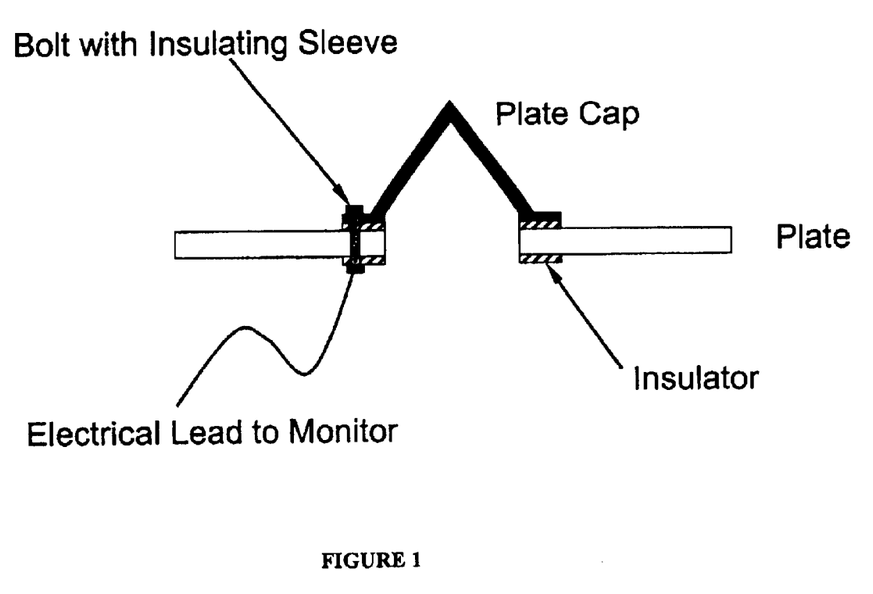
FIG. 1 is a drawing of distributor plate cap static measurement system.
Figure 2:
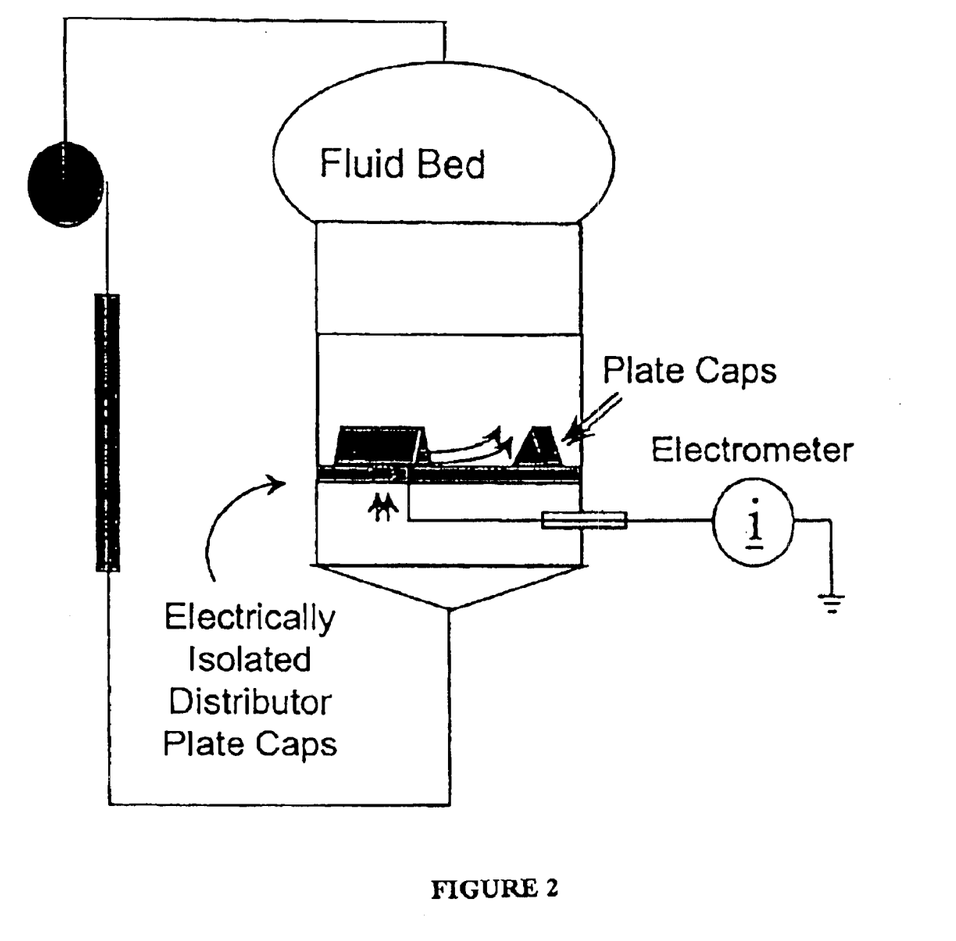
FIG. 2 is a schematic representation of a gas phase reactor using the distributor plate detector of the invention.

FIG. 1: FIG. 1 shows a schematic drawing of a side-view of a static probe of the present invention that is installed on the distributor plate of a reactor. A top view would show a hole in the plate of approximate size ⅝ inch, although any hole size would be appropriate. The cap cover the hole and extends on each side about 1 inch, although any length would be appropriate. The plate cap is a metallic conductor typically made of carbon steel or stainless steel. It is shown in a triangular shape or as an "angle iron". Other shapes also could be utilized such as a circular one ("pipe cap") or T-cap also termed a tuyere.

The plate cap is a high impact area. For example, at a nominal reactor superficial velocity of 2.0 ft/sec the plate probe experiences a hole velocity of 118 ft/sec. It therefore serves as a primary source of frictional triboelectrification. The plate caps are electrically insulated from the plate because the cap is grounded (i.e., charge generation lead to short circuit to ground). Thus, insulators are placed between the plate caps and the distributor plate. Any insulator is contemplated provided it is thermally and chemically stable. A non-limiting example of a suitable insulator is polytetrafluoroethylene (Teflon®).

The electrical lead is connected to a monitoring device. The monitoring device is an electrometer or low current meter (picoammeter), a digital volt meter, an ohmmeter, an oscilloscope, or the like. In specific embodiments, the electrical lead is insulated and fed from the high pressure reactor environment through a mechanical seal which is an insulator as well. In specific embodiments, a pressure sealing gland, such as those commercially available from Conax Buffalo Technologies, is used. The connection to the plate probe is shown at the bottom using a bolt with an insulated sleeve to contact the top plate. The sleeve isolates the bolt from the plate and provides electrical contact with the plate cap. Alternatively, the electrical connection is made at the upper end of the plate cap, if desired.

The static probe of the present invention provides a measure of overall wall condition in two respects. First, reactors operating with a good wall condition do not have a high plate static value in either a positive or negative charge sense. Secondly, the static level differences between the reactor and plate probe may be small and/or of the same sign, but remain with the limit of detection of the inventive probe. A static level that is indicative of a poor reactor wall condition or of an abnormal operation include at least one of a large fluctuation about zero for both the plate and reactor static probe; sign reversal between the plate and reactor static probes; and readings that alter from about zero, i.e. from the zero baseline.

In alternative embodiments, the static probe of the present invention is used in combination with at least one conventional static probe to provide a comparative measure of reactor static. More particularly, the net flux obtained by normalizing for the surface area of each probe is determined. Calculating the difference in the net flux for each probe is then used to determine the difference [between two probes. would provide a net measure of the charge generation and charge removal to obtain a measure of net charge accumulation.

It is contemplated that the distributor plate design may be modified, altered, changed as compared to a conventional design to, for example, effect the fluidization and/or thermodynamics of the polymerization reaction. Specifically, a distributor plate that comprises additional pores therein is used to decrease pressure, particularly at higher velocities. The additional pores increase the area and velocity there through. It is also contemplated that conventional static probes (and/or detector designs similar to the novel detector of the present invention) be located throughout the recycle system (e.g. at the compressor, heat exchanger/cooler and/or in recycle transfer lines) in addition to at the distributor plate via the novel detector of the present invention.

Radio Frequency Static Detection

In an alternate embodiment, the static charges may be measured using a radio frequency detector. The radio frequency range of the electromagnetic spectrum of the present invention includes between about 15 kHz to about 1 GHz. It is known in the art that a transmitter and a receiver are employed to propagate and intercept radio waves, respectively. Generally, a radio wave carries information-bearing signals and the information may be encoded directly on the wave by periodically interrupting its transmission or impressed on the carrier frequency through modulation, e.g., amplitude modulation (AM) or frequency modulation (FM). The modulated carrier may be amplified (i.e., using an amplifier) then applied to an antenna that converts the electrical signals to electromagnetic waves that radiate into space at the speed of light. Alternatively, the antenna is a receiving antenna that intercepts the radiation, converts it to an electrical signal and feeds it to a receiver. For example, an exemplary radio frequency antenna of the present invention comprises an AM radio receiving antenna. Alternatively, the antenna is a purpose built antenna and amplifier such as described in U.S. Pat. No. 5,315,255 to Bettinger, which is herein incorporated by reference in its entirety, and is used in those embodiments in which increased sensitivity, as compared to an AM radio antenna, is desired. Specifically, the radio frequency antenna may be a metal rod connected to an AM band radio receiver.

The radio frequency antenna offers a significant advantage over the prior art because discharges occurring anywhere in the reactor may be detected as opposed to localized detection. Glor, et al., 1989 described a technique of measuring static discharges of bulked polymeric granules in a silo using a simple wire antenna at a single frequency that was quiet in the AM band to monitor the incidents or amount of static noise (noise as listened to on a radio) that resulted from the electrical discharges inside the silo. A disadvantage of the method disclosed by Glor is that the antenna disclosed in Glor was subject to the forces in the fluid bed reactor such that electrical charge could occur by either triboelectrification or impact with neutral or charged polymer particles. These problems can be overcome, however, through the use of different antenna designs and by shielding the antenna. For example, in one embodiment, a ¼ wave shielded loop antenna can be used.

In practice, the shield antenna is used to detect changes in radio frequency signal that is indicative of static discharges within the reactor. By correlating these discharge events with changes in the reactor conditions, it is possible to use the changes in radio frequency signal to predict changes in the reactor performance, anticipating potential continuity events that can cause reactor failure.

Non-linear Analysis of a Reactor

The data derived from the devices for monitoring static changes described above are particularly useful when used as part of a non-linear analysis of a reactor's condition.

Electrostatic and surface forces (reactor wall, particle surface, etc.), reaction kinetics (STY, condensing, bed level, etc.) and heat transfer arising from fluidization are basic factors that influence the onset and occurrence of reactor sheeting. By monitoring one or more of these parameters and comparing changes in these parameters over time, a method for monitoring reactor conditions can be developed.

[Optimal reactor continuity is preferred and refers to a steady and efficient operation of a gas-phase fluidized bed reactor. The continuity results from the cumulative effects of system variables such as fluidized bulk density, reactor and reactor wall temperature, static charge, bed volume and bed pressure. A disturbance in the reactor continuity adversely effects production. A major disturbance is characterized by, for example, sheeting which refers to the formation or agglomeration of polymer sheets on a reactor wall or dome (see U.S. Pat. Nos. 5,436,304 and 5,405,922, the disclosures of which are incorporated herein be reference). Generally, major sheeting events require a reactor shutdown to correct. The invention relates to monitoring, detecting, analyzing, and controlling the reactor continuity during reaction initiation, nascent growth of the polymer, and termination of polymerization.

The non-linear analysis provides a method of determining a reactor continuity comprising the steps of measuring at least one system variable of the reactor, such as static charge using the novel distributor plate detector of the present invention, during a time period to generate data, filtering the data to demodulate a time series, calculating a signal from the filtered data and determining the reactor continuity by comparing the calculated signal to a signal of a control reactor (i.e. the reactor at steady state operations).

In a specific embodiment, the time period comprises the time required to collect more than one data point. In a specific embodiment, the system variables include a static charge, acoustic emission, differential bed pressure, bed total volume, fluidized bulk density, and reactor wall temperature. The static measurements are made using at least the novel distributor plate detector, optional in combination with conventional static probes and/or RF probes described above.

The data preferably comprises high speed data that are obtained at a collection rate greater than 1 Hz. This includes measurements recorded, at least at 200 data points per second for a duration of 5 minutes. The data acquisition process is iterative at a range of collection rates from 6 minutes to one hour intervals. This high speed data is low passed filtered with a cutoff frequency of about 40 Hz, thus frequency content above 40 Hz, or any event shorter than 25 msec in duration, is attenuated. Data recorded at about 5 points per second continuously throughout a measurement span are considered low speed data. A skilled artisan recognizes that data collection rates vary with experimental conditions, and the rate employed is sufficient to detect reactor continuity. A skilled artisan is aware that the appropriate instruments used to obtain data (i.e., bed pressure is measured by using a pressure tap) are well known in the art. The high speed data comprises a filtered fluidized bulk density, a bed total pressure drop, a static voltage, an acoustic emission and a skin thermocouple measurement.

The present invention and inventive methods are suitable for use for any olefin polymerization. Generally, the olefin polymerization comprises at least one alpha-olefin having from 2 to 20 carbon atoms, preferably 2–15 carbon atoms, for example, ethylene, propylene, butene-1, pentene-1, 4-methylpentene-1, hexene-1, octene-1, decene-1 and cyclic olefins such as styrene. Other monomers can include polar vinyl, dienes, norborene, acetylene and aldehyde monomers. In the preferred embodiments of the present invention, the polymerization comprises ethylene and at least optional one alpha-olefin having 3 to 15 carbon atoms such as propylene, butene-1, pentene-1, 4-methylpentene-1, hexene-1, or octene-1.

The present invention and inventive methods are also suitable for use with any known olefin polymerization catalyst system including chrome-based catalyst systems, conventional Ziegler-Natta catalyst systems and metallocene catalyst systems. Preferably, however, the present invention and inventive methods are employed for polymerizations comprising a metallocene catalyst component or catalyst system. Chrome catalyst compounds suitable for use in the present invention include $CrO_3$, chromocene, silyl chromate, chromyl chloride ($CrO_2Cl_2$), and the like. Non-limiting examples are disclosed in U.S. Pat. Nos. 3,709,853, 3,709,954, 3,231,550, 3,242,099 and 4,077,904, the disclosures of which are hereby fully incorporated herein by reference. Chrome catalyst systems may comprise an additional metal such as where the carrier material for the chrome catalyst (e.g. silica) is co-impregnated with, for example, a titanium compound such as titanium tetra-isopropoxide. Preferred chrome catalyst compound are chromate compounds and silyl chromate catalyst systems are particularly preferred for use in the present invention.

Conventional-type Ziegler-Natta transition metal catalysts include those traditional silyl-chromate catalysts that are well known in the art discussed, for example, in U.S. Pat. Nos. 4,152,502, 4,115,639, 4,077,904, 4,482,687, 4,564,605, 4,721,763, 4,879,359 and 4,960,741 the disclosures of which are hereby fully incorporated herein by reference. The conventional-type Ziegler-Natta transition metal catalyst compounds that may be used in the present invention include transition metal compounds from Groups 3 to 17, preferably 4 to 12, more preferably 4 to 6 of the Periodic Table of Elements.

These conventional-type Ziegler-Natta transition metal catalysts may be represented by the formula: $MR_x$, where M is a metal from Groups 3 to 17, preferably Groups 4 to 6, more preferably Group 4, most preferably titanium; R is a halogen or a hydrocarbyloxy group; and x is the valence of the metal M. Non-limiting examples of R include alkoxy, phenoxy, bromide, chloride and fluoride. Non-limiting examples of conventional-type transition metal catalysts where M is titanium include $TiCl_4$, $TiBr_4$, $Ti(OC_2H_5)_3Cl$, Ti(OC$_2$H$_5$)Cl$_3$, Ti(OC$_4$H$_9$)$_3$Cl Ti(OC$_3$H$_7$)$_2$Cl$_2$, Ti(OC$_2$H$_5$)$_2$Br$_2$, TiCl$_3$·⅓AlCl$_3$ and Ti(OC$_{12}$H$_{25}$)Cl$_3$.

Conventional-type Ziegler-Natta transition metal catalyst compounds based on magnesium/titanium electron-donor complexes that are useful in the invention are described in, for example, U.S. Pat. Nos. 4,302,565 and 4,302,566, the disclosures of which are hereby fully incorporated herein by reference. The MgTiCl$_6$ (ethyl acetate)$_4$ derivative is particularly preferred.

British Patent Application No. 2,105,355 and U.S. Pat. No. 5,317,036, the disclosures of which are hereby incorporated herein by reference, describe various conventional-type Ziegler-Natta vanadium catalyst compounds. Non-limiting examples of conventional-type vanadium catalyst compounds include vanadyl trihalide, alkoxy halides and alkoxides such as VOCl$_3$, VOCl$_2$(OBu) where "Bu" means "butyl" and VO(OC$_2$H$_5$)$_3$; vanadium tetra-halide and vanadium alkoxy halides such as VCl$_4$ and VCl$_3$ (OBu); vanadium and vanadyl acetyl acetonates and chloroacetyl acetonates such as V(AcAc)$_3$ and VOCl$_2$(AcAc) where (AcAc) is an acetyl acetonate. The preferred conventional-type vanadium catalyst compounds are VOCl$_3$, VCl$_4$ and VOCl$_2$—OR, where R is a hydrocarbon radical, preferably a C$_1$ to C$_{10}$ aliphatic or aromatic hydrocarbon radical such as ethyl, phenyl, isopropyl, butyl, propyl, n-butyl, iso-butyl, tertiary-butyl, hexyl, cyclohexyl, naphthyl, etc., and vanadium acetyl acetonates.

Still other conventional-type Ziegler-Natta transition metal catalyst compounds and catalyst systems suitable for use in the present invention are disclosed in U.S. Pat. Nos. 4,124,532, 4,302,565, 4,302,566, 4,376,062, 4,379,758, 5,066,737, 5,763,723, 5,849,655, 5,852,144, 5,854,164 and 5,869,585 and published EP-A2 0 416 815 A2 and EP-A1 0 420 436, the disclosures of which are hereby fully incorporated herein by reference.

Other catalysts may include cationic catalysts such as AlCl$_3$, and other cobalt, iron, nickel and palladium catalysts well known in the art. See for example U.S. Pat. Nos. 3,487,112, 4,472,559, 4,182,814 and 4,689,437 the disclosures of which are hereby fully incorporated herein by reference.

Typically, these conventional-type Ziegler-Natta transition metal catalyst compounds and some chrome-based catalyst systems are activated with one or more of the conventional-type cocatalysts described below.

Conventional-type cocatalyst compounds for the above conventional-type Ziegler-Natta transition metal catalyst compounds (as well as for the some chrome-based systems) may be represented by the formula M$^3$M$^4$$_v$X$^2$$_c$R$^3$$_{b-c}$, wherein M$^3$ is a metal from Group 1 to 3 and 12 to 13 of the Periodic Table of Elements; M$^4$ is a metal of Group 1 of the Periodic Table of Elements; v is a number from 0 to 1; each X$^2$ is any halogen; c is a number from 0 to 3; each R$^3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula M$^3$R$^3$$_k$, where M$^3$ is a Group IA, IIA, IIB or IIIA metal, such as lithium, sodium, beryllium, barium, boron, aluminum, zinc, cadmium, and gallium; k equals 1, 2 or 3 depending upon the valency of M$^3$ which valency in turn normally depends upon the particular Group to which M$^3$ belongs; and each R$^3$ may be any monovalent radical that include hydrocarbon radicals and hydrocarbon radicals containing a Group 13 to 16 element like fluoride, aluminum or oxygen or a combination thereof.

Non-limiting examples of conventional-type organometallic cocatalyst compounds useful with the conventional-type catalyst compounds described above include methyllithium, butyllithium, dihexylmercury, butylmagnesium, diethylcadmium, benzylpotassium, diethylzinc, tri-n-butylaluminum, diisobutyl ethylboron, diethylcadmium, di-n-butylzinc and tri-n-amylboron, and, in particular, the aluminum alkyls, such as tri-hexyl-aluminum, triethylaluminum, trimethylaluminum, and tri-isobutylaluminum. Other conventional-type cocatalyst compounds include mono-organohalides and hydrides of Group 2 metals, and mono- or di-organohalides and hydrides of Group 3 and 13 metals. Non-limiting examples of such conventional-type cocatalyst compounds include di-isobutylaluminum bromide, isobutylboron dichloride, methyl magnesium chloride, ethylberyllium chloride, ethylcalcium bromide, di-isobutylaluminum hydride, methylcadmium hydride, diethylboron hydride, hexylberyllium hydride, dipropylboron hydride, octylmagnesium hydride, butylzinc hydride, dichloroboron hydride, di-bromo-aluminum hydride and bromocadmium hydride. Conventional-type organometallic cocatalyst compounds are known to those in the art and a more complete discussion of these compounds may be found in U.S. Pat. Nos. 3,221,002 and 5,093,415, the disclosures of which are hereby fully incorporated herein by reference.

Generally, bulky ligand metallocene-type catalyst compounds include half and full sandwich compounds having one or more bulky ligands bonded to at least one metal atom. Typical bulky ligand metallocene-type compounds are generally described as containing one or more bulky ligand(s) and one or more leaving group(s) bonded to at least one metal atom. In one preferred embodiment, at least one bulky ligand is η-bonded to the metal atom, most preferably η$^5$-bonded to the metal atom.

The bulky ligands are generally represented by one or more open, acyclic, or fused ring(s) or ring system(s) or a combination thereof. These bulky ligands, preferably the ring(s) or ring system(s), are typically composed of atoms selected from Groups 13 to 16 atoms of the Periodic Table of Elements, preferably the atoms are selected from the group consisting of carbon, nitrogen, oxygen, silicon, sulfur, phosphorous, germanium, boron and aluminum or a combination thereof. Most preferably the ring(s) or ring system (s) are composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 15 and the lanthanide or actinide series of the Periodic Table of Elements. Preferably the metal is a transition metal from Groups 4 through 12, more preferably Groups 4, 5 and 6, and most preferably the transition metal is from Group 4.

In one embodiment, the bulky ligand metallocene-type catalyst compounds of the invention are represented by the formula:

I. L$^A$L$^B$MQ$_n$             (I)

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is a Group 4 transition metal, even more preferably M is zirconium, hafnium or titanium. The bulky ligands, L$^A$ and L$^B$, are open, acyclic or fused ring(s) or ring system(s) such as unsubstituted or substituted, cyclopentadienyl ligands or cyclopentadienyl-type ligands, heteroatom substituted and/or heteroatom containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, azenyl ligands, azulene ligands, pentalene ligands, phosphoyl ligands, pyrrolyl ligands, pyrozolyl ligands, carbazolyl ligands, borabenzene ligands and the like, including hydrogenated versions thereof, for example tetrahydroindenyl ligands. In one embodiment, $L^A$ and $L^B$ may be any other ligand structure capable of t-bonding to M, preferably $\eta^3$-bonding to M and most preferably $\eta^5$-bonding. In yet another embodiment, the atomic molecular weight (MW) of $L^A$ or $L^B$ exceeds 60 a.m.u., preferably greater than 65 a.m.u. In another embodiment, $L^A$ and $L^B$ may comprise one or more heteroatoms, for example, nitrogen, silicon, boron, germanium, sulfur, oxygen and phosphorous, in combination with carbon atoms to form an open, acyclic, or preferably a fused, ring or ring system, for example, a hetero-cyclopentadienyl ancillary ligand. Other $L^A$ and $L^B$ bulky ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of formula (I) only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkylcarbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis(difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. For the purposes of this patent specification and appended claims the term "leaving group" is any ligand that can be abstracted from a bulky ligand metallocene-type catalyst compound to form a bulky ligand metallocene-type catalyst cation capable of polymerizing one or more olefin(s). In one embodiment, Q is a monoanionic labile ligand having a sigma-bond to M.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluromethyl, tetramethylene, pentamethylene, methylidene, methyoxy, ethyoxy, propoxy, phenoxy, bis(N-methylanilide), dimethylamide, dimethylphosphide radicals and the like. Depending on the oxidation state of the metal, the value for n is 0, 1 or 2 such that formula (I) above represents a neutral bulky ligand metallocene-type catalyst compound.

In one embodiment, the bulky ligand metallocene-type catalyst compounds of the invention include those of formula (I) where $L^A$ and $L^B$ are bridged to each other by a bridging group, A, such that the formula is represented by II. $L^A A L^B M Q_N$                             (II)

These bridged compounds represented by formula (II) are known as bridged, bulky ligand metallocene-type catalyst compounds. $L^A$, $L^B$, M, Q and n are as defined above. Non-limiting examples of bridging group A include bridging groups containing at least one Group 13 to 16 atom, often referred to as a divalent moiety such as but not limited to at least one of a carbon, oxygen, nitrogen, silicon, boron, germanium and tin atom or a combination thereof. Preferably bridging group A contains a carbon, silicon, iron or germanium atom, most preferably A contains at least one silicon atom or at least one carbon atom. The bridging group A may also contain substituent groups R as defined above including halogens. Non-limiting examples of bridging group A may be represented by $R'_2C$, $R'_2Si$, $R'_2SiR'_2Si$, $R'_2Ge$, R'P, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system.

In one embodiment, the bulky ligand metallocene-type catalyst compounds are those where the R substituents on the bulky ligands $L^A$ and $L^B$ of formulas (I) and (II) are substituted with the same or different number of substituents on each of the bulky ligands. In another embodiment, the bulky ligands $L^A$ and $L^B$ of formulas (I) and (II) are different from each other.

Other bulky ligand metallocene-type catalyst compounds and catalyst systems useful in the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547 5,858,903, 5,859,158 and 5,929,266 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 748 821 and EP-B1-0 757 996, all of which are herein fully incorporated by reference.

In one embodiment, bulky ligand metallocene-type catalyst compounds useful in the invention include bridged heteroatom, mono-bulky ligand metallocene-type compounds. These types of catalysts and catalyst systems are described in, for example, PCT publication WO 92/00333, WO 94/07928, WO 91/04257, WO 94/03506, WO 96/00244 and WO 97/15602 and U.S. Pat. Nos. 5,057,475, 5,096,867, 5,055,438, 5,198,401, 5,227,440 and 5,264,405 and European publication EP-A-0 420 436, all of which are herein fully incorporated by reference.

In this embodiment, the bulky ligand metallocene-type catalyst compound is represented by the formula:

III. $L^C AJMQ_n$ (III)

where M is a Group 3 to 16 metal atom or a metal selected from the Group of actinides and lanthanides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted bulky ligand bonded to M; J is bonded to M; A is bonded to M and J; J is a heteroatom ancillary ligand; and A is a bridging group; Q is a univalent anionic ligand; and n is the integer 0, 1 or 2. In formula (III) above, $L^C$, A and J form a fused ring system. In an embodiment, $L^C$ of formula (II) is as defined above for $L^A$, A, M and Q of formula (III) are as defined above in formula (I). In formula (III) J is a heteroatom containing ligand in which J is an element with a coordination number of three from Group 15 or an element with a coordination number of two from Group 16 of the Periodic Table of Elements. Preferably J contains a nitrogen, phosphorus, oxygen or sulfur atom with nitrogen being most preferred.

In another embodiment, the bulky ligand type metallocene-type catalyst compound is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In an embodiment, the bulky ligand metallocene-type catalyst compound is represented by the formula:

IV. $L^D MQ_2(YZ)X_n$ (IV)

where M is a Group 3 to 16 metal, preferably a Group 4 to 12 transition metal, and most preferably a Group 4, 5 or 6 transition metal; $L^D$ is a bulky ligand that is bonded to M; each Q is independently bonded to M and $Q_2$ (YZ) forms a unicharged polydentate ligand; A or Q is a univalent anionic ligand also bonded to M; X is a univalent anionic group when n is 2 or X is a divalent anionic group when n is 1; n is 1 or 2. In formula (IV), L and M are as defined above for formula (I). Q is as defined above for formula (I), preferably Q is selected from the group consisting of —O—, —NR—, —CR$_2$— and —S—; Y is either C or S; Z is selected from the group consisting of —OR, —NR$_2$, —CR$_3$, —SR, —SiR$_3$, —PR$_2$, —H, and substituted or unsubstituted aryl groups, with the proviso that when Q is —NR— then Z is selected from one of the group consisting of —OR, —NR$_2$, —SR, —SiR$_3$, —PR$_2$ and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

In another embodiment of the invention, the bulky ligand metallocene-type catalyst compounds are heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these bulky ligand metallocene-type catalyst compounds are described in WO 96/33202, WO 96/34021, WO 97/17379 and WO 98/22486 and EP-A1-0 874 005 and U.S. Pat. Nos. 5,637,660, 5,539,124, 5,554,775, 5,756,611, 5,233,049, 5,744,417, and 5,856,258 the disclosures of which are hereby incorporated herein by reference.

In another embodiment, the bulky ligand metallocene-type catalyst compounds are those complexes known as transition metal catalysts based on bidentate ligands containing pyridine or quinoline moieties, such as those described in U.S. application Ser. No. 09/103,620 filed Jun. 23, 1998 U.S. Pat. No. 6,103,357 Aug. 15, 2000 the disclosures of which are hereby incorporated herein by reference. In another embodiment, the bulky ligand metallocene-type catalyst compounds are those described in PCT publications WO 99/01481 and WO 98/42664, the disclosures of which are hereby fully incorporated herein by reference.

In one embodiment, the bulky ligand metallocene-type catalyst compound is represented by the formula:

V. $((Z)XA_t(YJ))_q MQ_n$ (V)

where M is a metal selected from Group 3 to 13 or lanthanide and actinide series of the Periodic Table of Elements; Q is bonded to M and each Q is a monovalent, bivalent, or trivalent anion; X and Y are bonded to M; one or more of X and Y are heteroatoms, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms, preferably Z is a cyclic group containing 3 to 50 atoms, preferably 3 to 30 carbon atoms; t is 0 or 1; when t is 1, A is a bridging group joined to at least one of X, Y or J, preferably X and J; q is 1 or 2; n is an integer from 1 to 4 depending on the oxidation state of M. In one embodiment, where X is oxygen or sulfur then Z is optional. In another embodiment, where X is nitrogen or phosphorous then Z is present. In an embodiment, Z is preferably an aryl group, more preferably a substituted aryl group.

It is also within the scope of this invention, in one embodiment, that the bulky ligand metallocene-type catalyst compounds include complexes of $Ni^{2+}$ and $Pd^{2+}$ described in the articles Johnson, et al., "New Pd(II)- and Ni(II)-Based Catalysts for Polymerization of Ethylene and a-Olefins", J.

Am. Chem. Soc. 1995, 117, 6414–6415 and Johnson, et al., "Copolymerization of Ethylene and Propylene with Functionalized Vinyl Monomers by Palladium(II) Catalysts", J. Am. Chem. Soc., 1996, 118, 267–268, and WO 96/23010 published Aug. 1, 1996, WO 99/02472, U.S. Pat. Nos. 5,852,145, 5,866,663 and 5,880,241, the disclosures of which are hereby fully incorporated herein by reference. These complexes can be either dialkyl ether adducts, or alkylated reaction products of the described dihalide complexes that can be activated to a cationic state by the activators of this invention described below.

Also included as bulky ligand metallocene-type catalyst are those diimine based ligands of Group 8 to 10 metal compounds disclosed in PCT publications WO 96/23010 and WO 97/48735 and Gibson, et. al., Chem. Comm., pp. 849–850 (1998), the disclosures of which are hereby incorporated herein by reference.

Other bulky ligand metallocene-type catalysts are those Group S and 6 metal imido complexes described in EP-A2-0 816 384 and U.S. Pat. No. 5,851,945, the disclosures of which are hereby incorporated herein by reference. In addition, bulky ligand metallocene-type catalysts include bridged bis(arylamido) Group 4 compounds described by D. H. McConville, et al., in Organometallics 1195, 14, 5478–5480, the disclosure of which is hereby incorporated herein by reference. Other bulky ligand metallocene-type catalysts are described as bis(hydroxy aromatic nitrogen ligands) in U.S. Pat. No. 5,852,146, the disclosure of which is hereby incorporated herein by reference. Other metallocene-type catalysts containing one or more Group 15 atoms include those described in WO 98/46651, the disclosure of which is hereby incorporated herein by reference.

It is also contemplated that in one embodiment, the bulky ligand metallocene-type catalysts of the invention described above include their structural or optical or enantiomeric isomers (meso and racemic isomers, for example see U.S. Pat. No. 5,852,143, the disclosure of which is hereby incorporated herein by reference) and mixtures thereof.

EXAMPLES

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Example 1

Static Detection Using Radio Frequency

A reactor was monitored for static using a static detection system that was sensitive specifically to the magnetic component of the radio wave generated by the static discharge. The antenna employed was a ¼ wave shielded loop antenna, and thus was a shielded system that eliminated any stray Rf sources (i.e., radio stations, pagers, etc.) from contaminating the signal. The Rf frequency was scanned using a spectral frequency analyzer from about 15 kHz to about 1 GHz to observe activity corresponding to measured static or skin thermocouple to indicate continuity events, i.e., disturbances, in the reactor.

Example 2

Methods of Detecting Static at a Distributor Plate

The data were collected by measuring the current flow through each of two plate caps using a Keithley Model 6517A electrometer operating in a current mode. Data were collected on each of several points including the plate static as well as several standard reactor ball probes using a scanner card in the Model 6517A electrometer. Data at each point were collected at 125 readings/second for one minute and the average value recorded. Alternatively, the plate probes were connected to a dedicated Keithley Model 485 Picoammeter, and the sample point is dedicated continuously to the meter and logged as "spot" or instantaneous samples every 5 seconds.

Example 3

Figure 3:
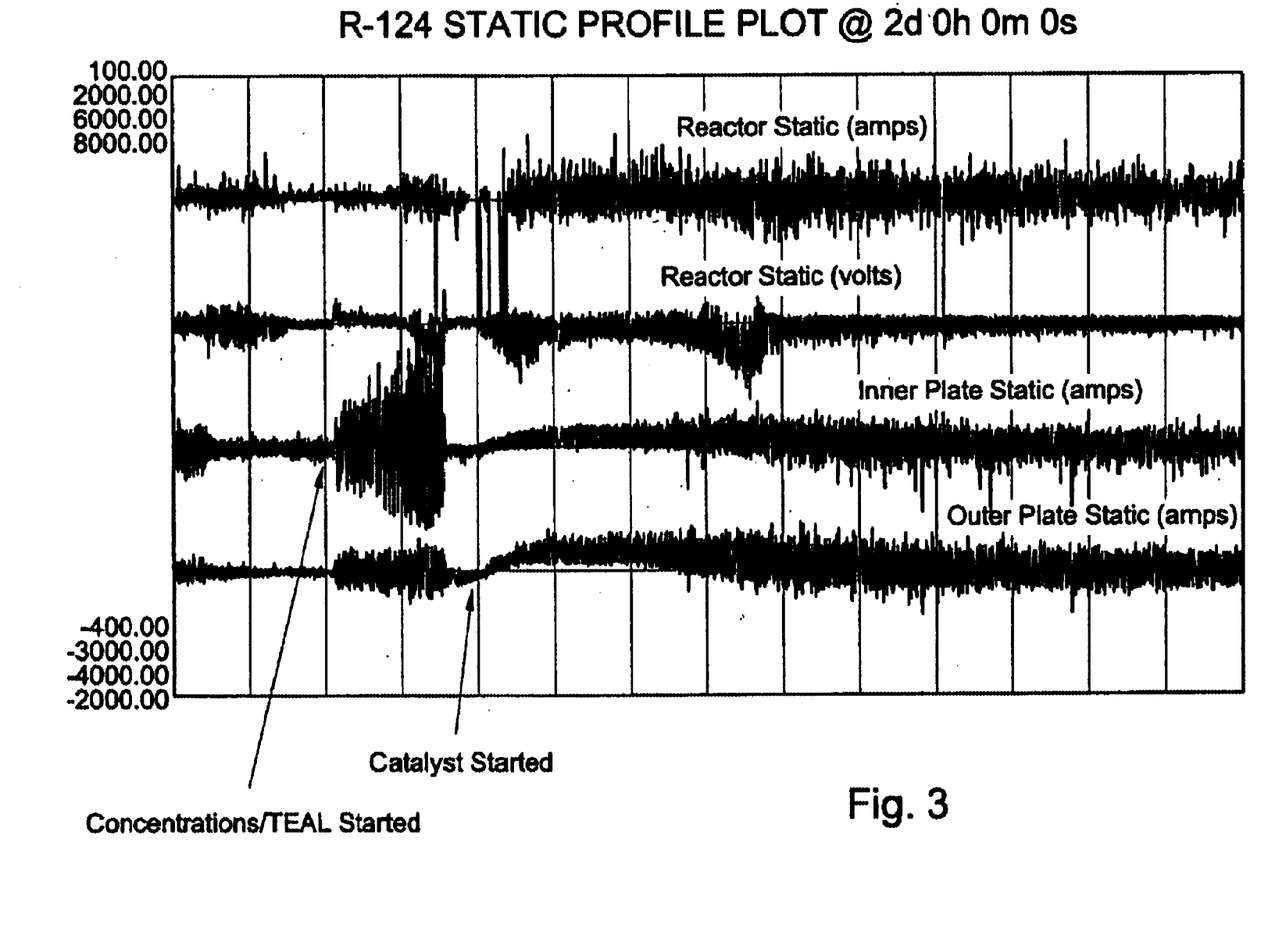
FIG. 3 is a static profile plot comparing the detection of static charges using conventional probes and the distributor plate detectors of the invention.

Referring to FIG. 3, which is comprised of four different static profiles showing data during a Ziegler-Natta catalyst startup. The arrow points to the time when we were building hydrocarbon concentrations and adding the aluminum alkyl co-catalyst, triethyl aluminum (TEAL). The top two profiles are data obtained from conventional probes positioned along the reactor wall. The top profile is referred to as (amps) and is an Auburn (now Progression, Inc.) manufactured probe with a low resistance input and measures the current flow from the probe to ground. The second probe is the typed described in U.S. Pat. No. 5,648,581, which has a very high input resistance and measures voltage or potential from the probe to ground. The bottom two profiles are data based on the novel distributor plate caps and measure the current flow.

The significance of FIG. 3 is two-fold. First of all, the novel distributor plate probes responded much earlier than the reactor probes when both TEAL and catalyst were started. Note that the top profile for the amp probe did not detect much static generation at all. Secondly, the sign of the static was positive for the distributor plate detectors whereas the conventional voltage probe was negative which is indicative of charge segregation effects. These data suggest the distributor plate itself causes positive charge generation that results in later larger reactor particle static but negative in magnitude.

Example 4

Figure 4:
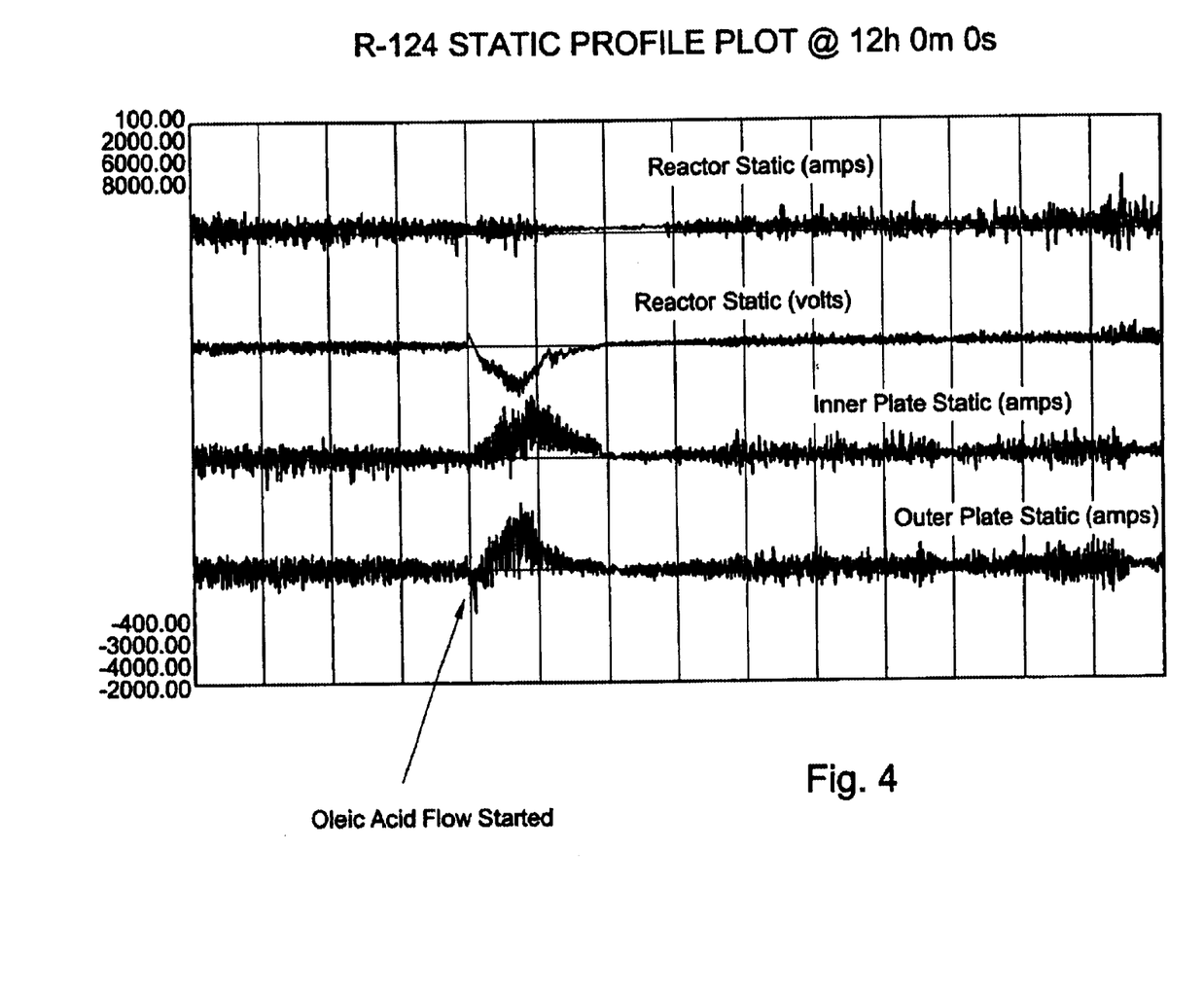
FIG. 4 is a static profile plot comparing detection of static charges using conventional probes and the distributor plate detectors of the invention.

Referring to FIG. 4, the four profiles pertain to the same probes as described for FIG. 3 above but it in this case the data results relate to a transition from a Ziegler-Natta catalyst system to a metallocene catalyst system. In this investigation, an additive, oleic acid, was added as a transition aid. FIG. 4 shows that the effect of the oleic acid on static generation was immediate. The conventional reactor amp probe did not show much of an effect although the static profile was narrowed. The conventional reactor voltage probe was more responsive but it measured a negative charge. Both of the distributor plate static detector assemblies showed quick responses. The detectors responded earlier than the conventional reactor amp probe but at about the same time as the conventional reactor voltage probe. The magnitude of the charge for the novel detectors was opposite of the conventional reactor probe providing further evidence of bed charge segregation and suggesting that the origin of the bed static relates to particles entering the bed through the distributor plate (rather than from particles rubbing against the reactor wall as is consistently the case for Ziegler-Natta catalyzed polymerizations.

Example 5

Figure 5:
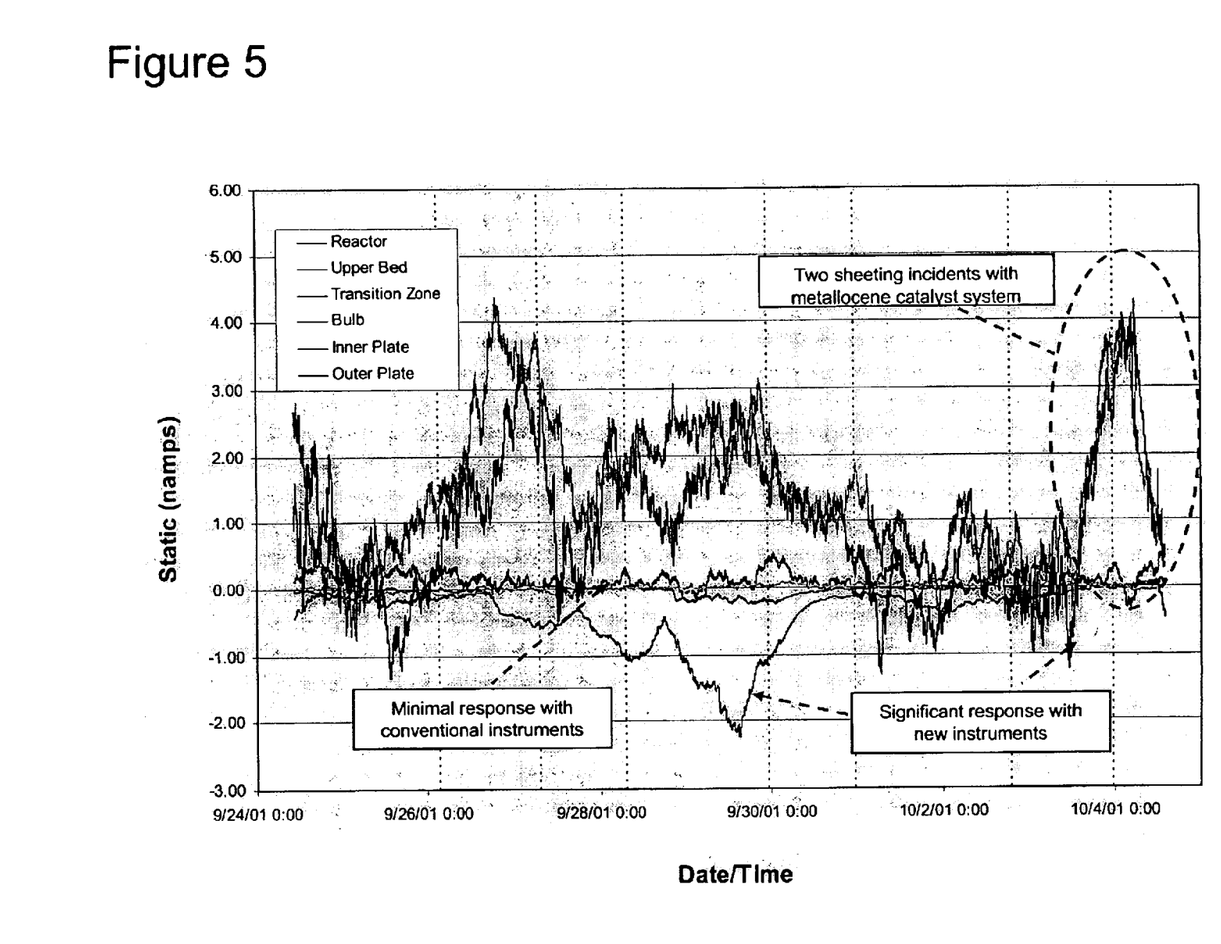
FIG. 5 is a static profile plot comparing the detection of static charges using conventional probes and the distributor plate detectors of the invention.

Referring to FIG. 5, which is comprised of six different static profiles taken during a metallocene-catalyzed polymerization. For this investigation, conventional static probes were located at the reactor wall near the distributor plate (labeled Bulb), in the fluidizing section (labeled Reactor), near the top of the targeted bed height (labeled Upper Bed), and about half along the reactor straight section and expanded section (labeled Transition Zone). Novel static detector assemblies were fitted to the underside (labeled Inner Plate) and topside (labeled Outer Plate) of the distributor plate. All of the conventional probes, except the Upper Bed, indicated no substantial static charging for the during of the investigations, while the two novel detector assemblies indicated repeated incidences of high static charging, including high charging directly associated with sheeting incidents. Where the Upper Bed conventional probed did indicate high static charging (i.e. before midnight on September 29), the both of the novel detectors also indicated the about same in magnitude but with opposite charging. That is, the conventional probe measured a negative charge, while the novel detector assemblies measured positive charges again providing evidence of charge segregation and suggesting that the origin static relates to particles passing through the distributor plate and/or from generation in the recycle system.

What is claimed is:

1. A method of determining a reactor wall condition of a gas phase fluidized bed reactor, said reactor wall condition comprising an accumulation of polymer along a reactor wall, said method comprising measuring a static level at a distributor plate of the reactor using a static detector assembly comprised of an electrically isolated distributor plate cap connected to the distributor plate and to an electrical lead connected to a monitor, wherein a deviation from zero in the static level indicates a poor reactor wall condition.

2. A method of determining static level at a distributor late of a gas phase fluidized bed reactor comprising:

a. measuring a current flow through an electrically isolated distributor plate cap located at the distributor plate to generate current flow data, wherein the distributor plate cap is connected to an electrical lead that is further connected to a monitor, and b. determining the static level from the current flow data.

3. The method of claim 1 or 2, wherein the distributor plate cap consists of a conductive metal.

4. The method of claim 3, wherein the conductive metal comprises graphite, carbon steel or stainless steel.

5. The method of claim 1 or 2, wherein the distributor plate cap further comprises an insulator located between the distributor plate and the distributor plate cap.

6. The method of claim 5, wherein the insulator comprises polytetrafluoroethylene.

7. The method of claim 1 or 2, wherein the connection between the distributor plate cap and the electrical lead further comprises a mechanical seal, wherein the seal is insulated.

8. The method of claim 1 or 2, wherein the monitor is selected from the group consisting of an electrometer, digital volt meter, ohmmeter, oscilloscope and picoammeter.

9. A method of determining a continuity disturbance in fluidized bed gas phase reactor comprising the steps of measuring static in the reactor using a radio frequency antenna and determining a discharge frequency or a pulse amplitude, wherein a change in discharge frequency or an increased pulse amplitude as compared a control indicates a continuity disturbance.

10. The method of claim 9, wherein the radio frequency comprises a frequency between about 15 kHz and about 1 GHz.

11. The method of claim 9, wherein the antenna comprises a shielded radio antenna.

12. The method of claim 9, wherein the radio frequency antenna further comprises an amplifier.

* * * * *